United States Patent
Del Grande (10) Patent No.: US 8,787,619 B2
(45) Date of Patent: Jul. 22, 2014

(54) TEMPORAL THERMAL IMAGING METHOD FOR DETECTING SUBSURFACE OBJECTS AND VOIDS

(71) Applicant: Nancy Kerr Del Grande, Newark, CA (US)

(72) Inventor: Nancy Kerr Del Grande, Newark, CA (US)

(*) Notice: Subject to any disclaimer, the term of this patent is extended or adjusted under 35 U.S.C. 154(b) by 0 days.

(21) Appl. No.: 13/943,154

(22) Filed: Jul. 16, 2013

(65) Prior Publication Data

US 2013/0322693 A1 Dec. 5, 2013

Related U.S. Application Data

(63) Continuation of application No. 13/018,911, filed on Feb. 1, 2011, now Pat. No. 8,494,220.

(60) Provisional application No. 61/337,716, filed on Feb. 9, 2010, provisional application No. 61/341,932, filed on Apr. 7, 2010, provisional application No. 61/342,184, filed on Apr. 9, 2010, provisional application No. 61/342,369, filed on Apr. 13, 2010, provisional application No. 61/393,597, filed on Oct. 15, 2010.

(51) Int. Cl.
*G06K 9/00* (2006.01)

(52) U.S. Cl.
USPC .......................................................... 382/103

(58) Field of Classification Search
USPC ......... 250/253, 338.1, 339.04, 339.06, 339.1, 250/339.14, 341.1, 341.6, 341.8, 342; 356/369; 374/137; 382/100, 103, 109, 382/312
See application file for complete search history.

(56) References Cited

U.S. PATENT DOCUMENTS

| | | |
|---|---|---|
| 4,005,289 A | 1/1977 | Del Grande |
| 4,257,106 A | 3/1981 | Auer |
| 5,444,241 A | 8/1995 | Del Grande et al. |
| 5,718,511 A | 2/1998 | Mundt |
| 6,841,781 B2 | 1/2005 | Toomey |
| 7,157,714 B2 | 1/2007 | Del Grande |
| 8,494,220 B2 * | 7/2013 | Del Grande .................. 382/103 |

OTHER PUBLICATIONS

Del Grande et al., "Dual-band infrared capabilities for imaging buried object sites", Lawrence Livermore National Laboratory, Livermore, California, SPIE vol. 1942, pp. 166-177, 1993.
Del Grande, N. Kerr, "Thermal inertia contrast detection of subsurface structures", Proc. of SPIE vol. 7299 72990D-1, doi: 10.1117/12.829407, © 2009.
Del Grande, Nancy, "Airborne Detection of Buried Minefields", Energy and Technology Review Dec. 1991, UCRL-52-000-91-12,9, pp. 9-21.

* cited by examiner

*Primary Examiner* — Gregory F Cunningham
(74) *Attorney, Agent, or Firm* — Lerner, David, Littenberg, Krumholz & Mentlik, LLP (57) ABSTRACT

A temporal thermal survey method to locate at a given area whether or not there is a subsurface object or void site. The method uses thermal inertia change detection. It locates temporal heat flows from naturally heated subsurface objects or faulty structures such as corrosion damage. The added value over earlier methods is the use of empirical methods to specify the optimum times for locating subsurface objects or voids amidst clutter and undisturbed host materials. Thermal inertia, or thermal effusivity, is the bulk material resistance to temperature change. Surface temperature highs and lows are shifted in time at the subsurface object or void site relative to the undisturbed host material sites. The Dual-band Infra-Red Effusivity Computed Tomography (DIRECT) method verifies the optimum two times to detect thermal inertia outliers at the subsurface object or void border with undisturbed host materials.

26 Claims, 7 Drawing Sheets

TEMPORAL THERMAL IMAGING METHOD FOR DETECTING SUBSURFACE OBJECTS AND VOIDS

CROSS-REFERENCE TO RELATED APPLICATIONS

The present application is a continuation, of U.S. patent application Ser. No. 13/018,911, filed Feb. 1, 2011, and claims the benefit of the filing dates of U.S. Provisional Patent Application Nos. 61/393,597, filed Oct. 15, 2010, entitled "Temporal Thermal Survey Method to Locate Subsurface Explosive Devices and Underground Tunnels"; 61/342,369, filed Apr. 13, 2010, entitled "Temporal Thermal Survey Method to Locate Subsurface Objects or Voids"; 61/342,184, filed Apr. 9, 2010, entitled "Temporal Thermal Survey Method to Locate Underground Tunnels and Caves"; 61/341,932, filed Apr. 7, 2010, entitled "Temporal Thermal Survey Method to Locate Subsurface Explosive Devices"; and 61/337,716, filed Feb. 9, 2010, entitled "Temporal Method to Locate Buried Objects," the disclosures of which are hereby incorporated herein by reference.

BACKGROUND OF THE INVENTION

The present invention by incorporating temporal thermal imaging using dual band infrared (IR) wavelengths enables locating underground objects such as subsurface explosive devices, underground tunnels and caves, and other subsurface structures and sites such as underground pipes or other objects, in addition to locating structural flaws such as cracks and corrosion in structures such as pipes, bridge decks or other objects whether buried or on the surface.

The temperature of the earth's surface is impacted by the many processes that control the net flow of energy into and out of its surface. The largest contribution is the direct heating by the sun. The surface can also be heated or cooled by conduction (flow of energy from warmer areas to cooler areas), convection (flow of energy due to movement of air/water above the surface) and evaporative cooling (flow of energy due to evaporation of water at the surface.) Each process has its own level of impact and timescale on which it is relevant.

The diurnal cycle is a primary driver (directly and indirectly) of the temperature of the surface. When light from the sun falls on the earth's surface the absorbed energy (the percentage of which is the surface albedo) will increase the temperature of that surface. When the temperature at the surface is higher than that below that surface, energy will be conducted downward. The amount of energy that the subsurface can absorb and the speed at which it can absorb it goes a long way toward determining the surface temperature.

A column of solid earth material above and including a hollow or semi-empty underground object has less thermal inertia (resistance to temperature change) than an adjacent, equal-volume column of solid earth material without the hollow object. Typical subsurface objects displace the host materials which surround them. A column of earth material above hollow, or partially-empty objects undergoes larger diurnal or seasonal temperature changes, has warmer than ambient surface temperatures at midday, or during autumn, and has cooler than ambient temperatures at predawn, or during spring. This applies to, e.g., subsurface explosive devices, tunnels, caves, drains, tombs, pipelines, channels, cisterns, sewers, vessels, bunkers, trailers, and other such structures and sites, as well as surface and buried structures having flaws such as cracks and areas of corrosion.

Scientists have routinely used long wavelength IR bands at 8-12 microns or medium wavelength IR bands at 3-5 microns for thermal imaging in limited applications. The single IR band apparent thermal image has a non-thermal spectral reflectance component which is useful, for example, rock type mapping, mineral recognition, or monitoring distressed crops. However, the conventional single band thermal imaging is difficult to interpret. It yields imprecise information that is insensitive to the subtle heat flow anomalies produced by subsurface flaws and foreign objects. These conventional single band imaging techniques fail to distinguish between surface emissivity clutter and true temperatures. In addition, emissivity-related noise, typically 1 or 2 degree ° C., cannot be removed using a single passive thermal IR band even when used in conjunction with another active laser reflectance IR band.

The more recent technique of Dual Band Infrared (DBIR) Imaging has numerous advantages over the conventional thermal imaging which utilizes only a single IR band. DBIR imaging has been used to detect buried land mines by exploiting temperature differences between the mine site and the surrounding soil. U.S. Pat. No. 4,005,289 describes this method, the disclosure of which is incorporated herein by reference. See also N. K. Del Grande, et al., "Buried Object Remote Detection Technology For Law Enforcement, in Surveillance Technologies, SPIE 1479, p. 335, 1991," which notes the difficulty of removing clutter from corrected temperature maps lacking thermal inertia diagnostics; N. K. Del Grande, P. F. Durbin, M. R. Gorvad, D. E. Perkins, G. A. Clark, J. E. Hernandez and R. J. Sherwood, "Dual-band Infrared Capabilities for Imaging Buried Object Sites", in Proc. of SPIE Conference 1942; and Underground and Obscured Object Imaging and Detection, Ed. N. Del Grande, I. Cindrich and P. Johnson, Orlando Fla., pp. 166-177, Apr. 15-16, 1993, the disclosures of which are incorporated herein by reference.

The DBIR imaging technique reduces false detections produced by clutter. It decouples the heat patterns (associated with underground hollow or semi-empty tunnel sites) from the surface emissivity patterns (associated with clutter). Clutter typically produces 1 or 2° C. apparent temperature-difference patterns. Most sites with clutter cannot be distinguished from subsurface explosive devices or underground tunnels and caves using a single passive thermal IR band. The DBIR technique uses two passive thermal IR bands to separate the image's thermal components from its emissivity components.

The DBIR approach clarifies thermal emission imagery by combining images from filtered medium wavelength 3-5 micron (MWIR) (e.g., 4.3-5.1 microns) and filtered long wavelength 8-12 micron (LWIR) (e.g., 9.6-11.6 microns) focal plane arrays. It senses temporal heat flows from variable-depth objects and voids such as cracks (contained air gaps or corrosion). It does this at least two times during the diurnal or annual cycle, when solar-heated hollow or semi-empty objects produce above ambient or below ambient temporal thermal and thermal inertia signatures unlike those of foreign-object clutter or those of the undisturbed host materials.

The DBIR images have similar thermal emission patterns but different spectral reflectance patterns. This approach, unlike the long wavelength infrared or medium wavelength infrared single-band approach, allows the user to identify weak heat flows from underground objects such as subsurface explosive devices (SSEDs) or deep underground tunnels (UGTs) and caves apart from natural terrain and foreign object clutter.

Thermal inertia diagnostics have also been used in conjunction with DBIR imaging to map flaws in heated structures (delamination gaps in bridge decks and corrosion gaps in aircraft) by exploiting thermal differences between the flaw and the structural material. U.S. Pat. No. 5,444,241, incorporated herein by reference, describes this method.

The most recent technique is the Dual Infra-Red Effusivity Computed Tomography method: (DIRECT). This method adapts DBIR imaging of emissivity corrected temperatures for locating SSEDs and UGTs as described in U.S. Pat. No. 7,157,714, the disclosure of which is incorporated herein by reference. Surface heat flow signatures occur periodically during the day and night, for objects (e.g., land mines) less than 1 meter deep, and annually during diverse seasons, for hollow or semi-empty objects (e.g., drainage channels) more than 1 meter deep. See N. K. Del Grande, "Thermal inertia contrast detection of subsurface structures", Proc. of the SPIE Conference, Thermosense XXXI, Vol. 7299, pp. 166-178, Orlando, Fla., United States, 14-15 Apr. 2009, the disclosure of which is incorporated herein by reference.

The DIRECT approach discussed in U.S. Pat. No. 7,157,714 uses a temperature simulation model (e.g., an Annual Surface Climate Energy Budget, ASCEB, Model) to locate temporal heat flows from underground objects at times commensurate with their depth, density, volume, material and effusivity compared to that of the ambient host materials. The ASCEB model inputs over a dozen environmental parameters to determine suitable thermal survey times and conditions for simulating soil temperatures and temperature spreads which will detect, locate and characterize the subsurface object or structure.

Optimum times for thermal imaging surveys depend on the object depth, dimensions, material, and contrasting host material properties. In most cases, some of these characteristics will be unknown initially. Initial estimates used to establish thermal survey dates and times are based on the daily (or annual) air temperature response and the undisturbed terrain temporal thermal properties. This provides input to a daily (or annual) surface temperature simulation model. The model simulates the surface temperature response times which enhance detection of underground objects from an airborne platform.

The DIRECT procedure records air and surface material (such as soil, roadway or water) temperature highs, lows, and high minus low temperature differences. The method highlights thermal and thermal inertia contrast at the borders of variable-depth objects having physical, thermal and temporal properties which differ from natural terrain. It designates suitable survey times based on the model to locate objects with variable depths, dimensions and host material properties. It collects thermal data at an alternative site with similar surface cover and host materials at times which provide optimum thermal and thermal inertia contrast.

The present invention provides improved temporal methods to the DIRECT approach by using an empirical approach to locate temporal heat flows from objects at survey times commensurate with their depth, density, volume, material and effusivity compared to that of the ambient host material. The approach of the present invention avoids the need to use temperature simulation models to locate temporal heat flows.

SUMMARY OF THE INVENTION

The naturally heated sites of typical buried objects embedded in solid host materials have surface thermal signatures which occur before the sites of ambient host materials heat up (or cool down). They heat up or cool down faster and sooner than their surroundings. They have less thermal inertia per unit volume, and larger high minus low daily temperature spreads, than the denser undisturbed terrain. Their surface temperature highs and lows occur after the air temperature highs and lows and before the highs and lows of the ambient terrain.

Conversely, the naturally-heated sites of solid objects enclosed in hollow or semi-empty containers have more thermal inertia per unit volume, smaller high minus low daily temperature spreads, and take longer to heat up (or cool down) than their less dense surroundings. Their surface temperature highs and lows occur after the air temperature highs and lows and after the highs and lows of their hollow or semi-empty containers.

The present invention by incorporating temporal thermal imaging using dual band infrared (IR) wavelengths enables locating underground objects such as subsurface explosive devices, underground tunnels and caves, and other subsurface structures and sites such as underground pipes or other objects. Likewise, normal and corroded structures such as bridge decks heat and cool at different rates depending on their thermal inertias. The method of the present invention can therefore be used to detect corrosion cracks, material loss gaps and delaminations in faulty structures such as pipes and bridge decks. The method is useful to locate and quantify the size and extent of the damage in faulty structures such as aged and weathered transportation structures (e.g. bridges, highways, landing strips, transmission pipelines, train superstructures and aircraft). For example, the temporal thermal survey maps of bridge decks provide a 3-D visual display of interior deck delaminations formed from corrosion cracks, gaps and material losses in the concrete. Each of the above individually and collectively being referred to hereinafter as an artifact.

Planck's law states that radiation emitted by a source can be related to its temperature. Based on a binomial expansion of Planck's law for temperatures near room temperature, the expansion of Planck's law states that the radiant emittance of a surface is proportional to emissivity times absolute temperature to the power of (50/wavelength in microns).

A power law thermal model provides the physical rationale for taking signal ratios of narrow IR bands based on equations derived from a binomial expansion of Planck's law. These signal ratios are insensitive to the natural surface emissivity and provide emissivity-corrected thermal responses. The derivation of this model is given in the Appendix of LeSchack and Del Grande, "A Dual-Wavelength Thermal Infrared Scanner as a Potential Airborne Geophysical Exploration Tool," Geophysics, VOL. 41, No 6 (December 1976) P. 1318-1336, incorporated herein by reference. In accordance with an embodiment of the present invention, this model is used to determine signal ratios that are in turn used to remove surface emissivity noise.

The emissivity of surface materials is highly variable from one land area to another. However the ratio of signals at two or more wavelengths can be used to obtain highly precise surface-temperature measurements that depend very little upon emissivity variations. For example, temperature differences as small as 0.2 degrees ° C. can be obtained by using the present invention.

At wavelengths where the radiation has the same spectral slope as a blackbody source, i.e., an object that absorbs all radiation, the emissivity ratio variations are very small. Thus, in an aspect of the invention, quantitative temperature measurements are made using signal ratios that are calibrated against a standard blackbody source.

A typical grey-body surface is an object that absorbs about 95-99% of all radiation and thus has an emissivity of less than 1. If a structure is a grey body, its respective temperatures will look alike at wavelengths of 5 micrometers and 10 micrometers.

Where the surveyed structure behaves in true grey-body fashion, no matter what area is scanned, the ratio of emissivity at one wavelength divided by the emissivity at a second wavelength $\epsilon_{\lambda,1}/\epsilon_{\lambda,2}$ is constant. The ratio of two signals at differing wavelengths can then be calibrated and the blackbody temperature obtained. In one aspect of the present invention, $\lambda_1=5$ μm and $\lambda_2=10$ μm, respectively, because these are the common wavelengths that are recorded by present-day scanners.

Because the heat flow anomaly is difficult to accurately measure, corrections may be made to accurately associate the thermal anomaly with a subsurface object. Furthermore, measured surface temperatures can be inaccurate because of an emissivity factor (noise) generated by clutter. Clutter may include, e.g., shadows, clouds, tracks, stains, disturbed terrain, holes, vegetation, foreign objects, foreign materials, foreign soils, water, cool air pools and roughness variations.

Cumulative extraneous effects (e.g., noise produced by clutter) that can mask temperature anomalies are often an order of magnitude greater than the desired anomalous component. Appropriate corrections are therefore preferably made to facilitate interpretation. Clutter of a specular nature may be identified and removed by image processing because it has a distinctive emissivity signature. The emissivity factor produced by reflected-infrared signal noise, relates to the ability of surfaces which produce clutter to emit radiant energy less than that of a black body at the same temperature and differently at one wavelength than at another. A black body is an ideal surface that absorbs and emits all radiation without reflection.

Features of the DIRECT temporal thermal approach of the present invention are its use of precisely measured, curve-fitted field data for:
(1) Optimizing thermal survey times to enhance detection of object sites.
(2) Providing database input to account for object site temporal heat flows.
(3) Recognizing object sites amidst decoys, foreign objects and natural terrain.
This approach uses dual-band IR images to remove non-thermal clutter. It schedules dual survey times to distinguish unique SSED site signatures from those of decoys, foreign objects or host materials. This simplifies clutter removal and clarifies target recognition.

Advantages of thermal inertia contrast detection compared to other approaches are, it:
(1) enhances surface temperature differences versus time to locate tunnels or object-voids at depth; maps heat flows from naturally-heated voids at depths 2-20 times their heights;
detects substructure voids at standoff distances from 10 to 10,000 feet above ground;
(4) removes clutter from foreign objects and non-thermal (reflected or absorbed) signals;
(5) views the location and orientation of subterranean tunnels and passageways; and
(6) displays the depth, height and volume of underground voids in 3-D.
(7) Distinguishes safe from hazardous locations which may contain explosive devices or support "at risk" structures e.g., corroded bridge decks or natural gas transmission lines.

An alternative approach to using an Annual Surface Climate Energy Budget (ASCEB) model described in U.S. Pat. No. 7,157,714 is to map air and host material temporal thermal changes which distinguish object sites from normal, undisturbed host material sites. Realistic input parameters are provided using the DIRECT method as an empirical approach to locate and characterize the depth and dimensions of object sites. This is used to enhance detection of thermal inertia outliers at the borders of object sites.

An automated airborne temporal thermal survey method, applicable to any area of the world, is described in accordance with the present invention to detect the presence of buried objects and indicate general information about the size, type and depth of the object. The approach takes advantage of heating and cooling rate differences between background materials and the location that contains buried objects. The method uses dual (mid-wave IR and long-wave IR) thermal imagery and a modeling approach to determine the highest probability of detecting objects of a particular size and at a particular depth. The approach highlights thermal contrast at the locations of buried objects. It uses dual bands to provide the ability to determine temperature and emissivity independently, effectively removing background clutter.

To model the daily natural or manmade surface temporal thermal behavior, such as the surface temperature versus time responses to different weather conditions requires:
(1) Measuring precise near-surface temperatures of the air and surface-material at 10 minute intervals for several days under different weather conditions,
(2) Curve-fitting the air and near-surface roadway material data taken, with and without a buried surrogate object, at times when shallow temperature gradients and heat flows change rapidly at the surface, and
(3) Scheduling thermal survey times to correspond with time periods which have optimum thermal contrast at object sites during the day and night for different materials and weather conditions.

The present invention selects times when the temperature spreads suffice to detect, locate and characterize the subsurface objects amidst foreign-object clutter and undisturbed background terrain. The data base tabulates time periods when surface temporal heat flows from buried object sites enhance surface temperature contrast and daily 0 to 1 m or 2 m depth temperature-spread differences≥0.5° C. relative to background temperature spread differences for measured overburden materials and depths.

The temporal response routine fits actual data recorded during clear, calm, dry weather (or light clouds, mild wind speeds and scattered showers) when unmanned aerial vehicle (UAV) thermal imagery would be most (or barely) effective. Curve fits will smooth, merge, and characterize data taken during four periods: near sunrise when shallow surface materials are warming, midday when there is little change, late afternoon when shallow surface materials cool at the fastest rate and late evening when shallow surface materials cool at a slower rate.

The de-clutter routine co-registers dual band IR thermal images and masks areas which have "apparent thermal" differences using MWIR and LWIR thermal imagery. It provides corrected temperature maps, and emissivity (spectral-difference) maps.

The feature recognition routine combines the co-registered, corrected temperature images taken at two times when the host material (displaced or not displaced by an embedded object) has the largest temperature contrast at the site of an object. These times are determined using look-up tables in the data base. The data base is composed of the results of curve-fitted field data taken using surrogate object materials surrounded by typical host materials.

A temporal thermal method for locating underground objects and voids, including structural flaws such as cracks and corrosion in accordance with one embodiment of the present invention comprises using an empirical method to determine a first imaging time and a second imaging time; imaging two different IR wavelength bands at the first imaging time at a first location and a second location to obtain a first temperature map; imaging the two different IR wavelength bands at the second imaging time at the first location and the second location to obtain a second temperature map; and using the first and second temperature maps to determine if an underground object is located beneath the first or second location or an object has a structural flaw.

The IR imaging method and use of the temperature maps to determine if an underground object is located is more fully disclosed in U.S. Pat. No. 7,157,714.

In accordance with one embodiment of the invention, there is described a temporal thermal method for detecting thermal inertia differences comprising: using an empirical method to determine a first imaging time and a second imaging time; imaging two different IR wavelength bands at the first imaging time at a first location and a second location to obtain a first temperature map; imaging the two different IR wavelength bands at the second imaging time at the first location and the second location to obtain a second temperature map; and using the first and second temperature maps to determine the existence of a thermal inertia difference between the first location and the second location.

In accordance with another embodiment of the invention, there is described a temporal thermal method for detecting an artifact comprising: imaging two different IR wavelength bands at a first imaging time at a first location host material and a second location to obtain a first temperature map, the first location comprising a host site and the second location comprising an artifact site, wherein the first imaging time is based upon the temporal thermal response of one of a surrogate host site or a surrogate artifact site; imaging two different IR wavelength bands at a second imaging time at the first location and the second location to obtain a second temperature map, wherein the second imaging time is based upon the temporal thermal response of one of the surrogate host site or the surrogate artifact site; using the first and second temperature maps to determine the existence of an artifact.

In accordance with another embodiment of the invention, there is described a temporal thermal method for detecting an artifact from thermal inertia differences between a host site and an artifact site, the method comprising: establishing a data base of temporal thermal responses for a surrogate host site and a surrogate artifact site under different weather conditions; imaging two different IR wavelength bands at a first imaging time at a host site and at an artifact site to obtain a first temperature map, the first imaging time corresponding to when the surrogate host site thermal response occurs before its daily high or annual high temperature obtained from the data base; imaging two different IR wavelength bands at a second imaging time at the host site and at the artifact site to obtain a second temperature map, the second imaging time corresponding to when the surrogate host site thermal response occurs before its daily low or annual low temperature; using the first and second temperature maps to determine thermal response differences between the host site and artifact site to detect an artifact at the artifact site.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

Thermal inertia (effusivity) change detection can be used to find less solid and less dense underground object locations, such as subsurface explosive devices, underground tunnels and caves, and other structures and sites such as underground pipes, or other objects, i.e., an artifact amidst clutter and the surrounding host materials such as natural earth materials, paved roads or bodies of water. It can also be used to locate and quantify the size and extent of delaminations within paved bridges, highways and landing strips and material-loss thinning within coated or covered pipelines and aircraft skins, i.e., an artifact. This enables better assessment of potential hazards posed by the "at risk" aged and weathered transportation infrastructure (e.g., bridges, highways, landing strips, transmission pipelines and aircraft).

Surface temperature changes are typically larger and peak earlier during the natural heating cycle for object locations than for natural terrain. DBIR thermal imaging decouples surface heat patterns (associated with underground objects) from surface emissivity patterns (associated with non-thermal clutter). Precise temperature maps reveal underground object locations which are cooler after midnight and warmer after noon than the natural soil. At optimum thermal survey times, thermal inertia outliers which vary with the depth and volume of the underground objects have enhanced thermal inertia contrast relative to natural earth materials, paved roads or water bodies.

Figure 1:
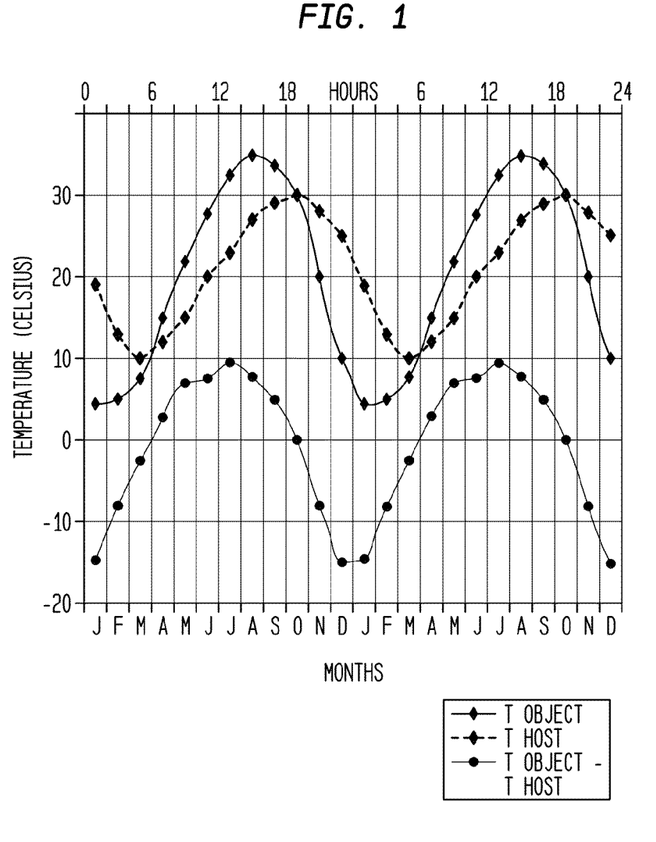
FIG. 1 is a graph showing hypothetical time shifted thermal responses of the host material site, buried object site and their temperature differences.

FIG. 1 shows a hypothetical case. Sinusoidal-like waves are used to describe the concept. The FIG. 1 top hourly time scale applies to objects less than one meter deep and the bottom monthly time scale applies to objects more than one meter deep. The leading upper curve applies to the object site surface thermal response, or the thermal response for damaged structures. The lagging upper curve applies to the host site surface thermal response or the thermal response for normal undamaged structures. The lower curve maxima and minima describe the object site minus the host site maximum above and below average temperature differences (contrast) occurring twice during a heating cycle. In practice, other curves may be used to better fit the measured temporal surface thermal data.

The lagging upper curve temporal parameters in FIG. 1 represent the host material above-ambient temperature highs, below-ambient temperature lows, mean temperature, and crossover times when the host material temperature crosses the normal (undamaged) structure mean (or 20° C.) temperature. The leading upper curve has temporal parameters in FIG. 1 representing the behavior of a location where the object site or damaged structure site has less thermal inertia than the host material site or that of undamaged structures. The solar radiation heats this location to its above ambient temperature faster and to a higher temperature than it heats the host material location. There is displaced host material in this location which is less dense compared to the bulk density of the undisturbed host material.

The lower curve in FIG. 1 represents the temperature difference between the buried object site (leading upper curve) which disturbed the solid earth material and the solid earth material site (lagging upper curve) which has more thermal inertia, or resistance to temperature change, or between the damaged structure and undamaged structure. The separate peaks occur at different times, the lower curve at noon, the leading upper curve at 3 pm and the lagging upper curve at 6 pm.

The measured temporal thermal response parameters are stored in a data base for different weather conditions. The data base is used to precisely time the two thermal surveys needed to accurately locate and characterize different objects, at different depths, embedded in different host materials, and measured under different weather conditions.

The buried or covered object site temporal response depends on the depth and volume of the host material overburden and the relative thermal inertia per unit volume of the host material with and without the subsurface object. Subsurface object sites with contained air gaps (voids) have leading surface temperature highs, in August (if deep) or at 3 pm, (if shallow). They have surface temperature lows, in February (if deep) or at 3 am (if shallow). Host materials have delayed surface temperature highs in October or at 7 pm, and surface temperature lows in March or at 5 am. Consequently, thermal surveys show peak above-average surface thermal contrast in July or at 1 pm and peak below-average thermal contrast from December to January or from 11 pm to 1 am the following day. This temperature versus time response is what one observes at the borders of the buried or covered object site.

Compared to a normal structure, the damaged structure has less thermal inertia per unit volume of damaged material. It has higher thermal highs, lower thermal lows, larger (high minus low) temperature spreads, and leading temperature phases. The separate peaks occur at different times. Typical maximum thermal contrast peaks occur from mid-morning to noon, damaged structure thermal peaks occur from noon to 3 pm and normal structure thermal peaks occur from 3 pm to 6 pm. These times are specified in the data base look-up tables, which take into account the temporal air thermal response and respective damaged and normal structure material depths, volumes and thermal inertias.

Thermal surveys with the goal to locate underground or corrosion-damaged object sites should be scheduled twice to achieve maximum thermal contrast as the solar irradiance increases from sunrise to noon (during spring and summer) and decreases from noon to sunset (during fall and winter). Once is after sunrise (or spring) when the host site temperature which heats up slowly is below the mean daily (or mean annual) temperature and the air and object site temperatures are above the mean daily (or mean annual) temperatures. And once again is after sunset (or fall) when the host site temperature is above the mean daily (or annual) temperature and the air and object site temperatures are below the mean daily (or mean annual) temperatures. In FIG. 1, from 9 am to 11 am for objects less than 1 m deep, and May to June for objects deeper than 1 m, object site locations with below-ambient thermal inertias have more thermal contrast since their borders heat up at faster rates than the host terrain. From 9 pm to 11 pm and November to December, object site locations with below-ambient thermal inertias have more thermal contrast since their borders cool down at faster rates than the host terrain.

Figure 2:
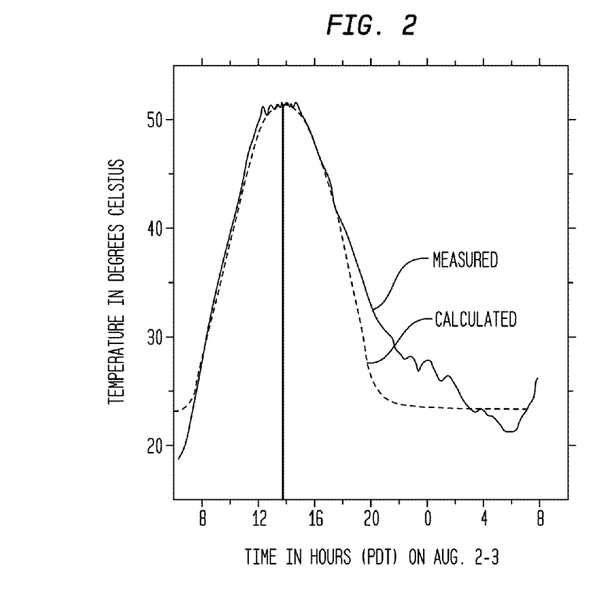
FIG. 2 is a graph showing the measured and calculated temporal response for shallow sand temperatures taken hourly.

FIG. 2 is a graph showing the measured and calculated sand temperature versus time response. The Annual Surface Climate Energy Budget (ASCEB) model simulated soil temperatures which agreed with measurements from 8 am to 6 pm, but disagreed from 6 pm to 8 am the next day. The ASCEB model prior its 2011 configuration did not properly account for the combined dew, soil moisture, vegetation and convection occurring at the air-soil surface interface. Curve fits are made to the measured day and night near-surface thermal data (and included in a data base) to designate optimum times during the heating and cooling cycle which enhance thermal inertia contrast for host material overburdens of dry sand or other materials.

Weather station data are used to record periodic temperatures of the air at 2 m above the surface, and of the undisturbed host materials at depths which may cover or surround buried objects and underground tunnels or damaged structures.

Figure 3:
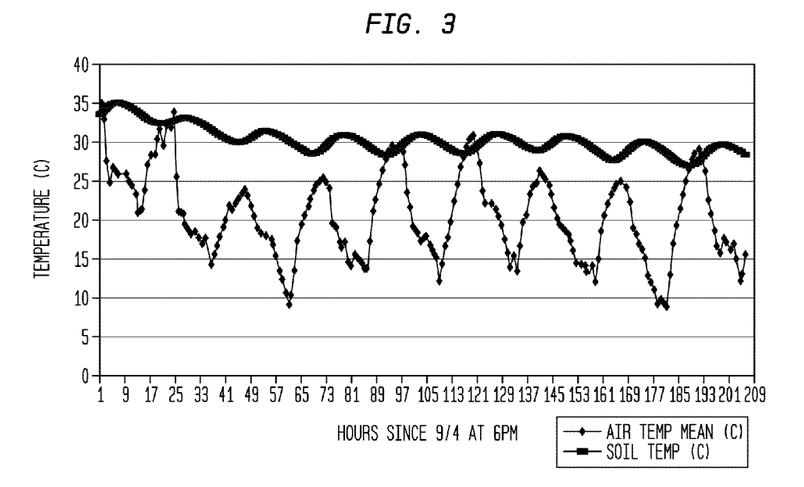
FIG. 3 is a graph showing the periodic daily air (below) and 25 cm deep soil (above) temperatures taken hourly.
Figure 6:
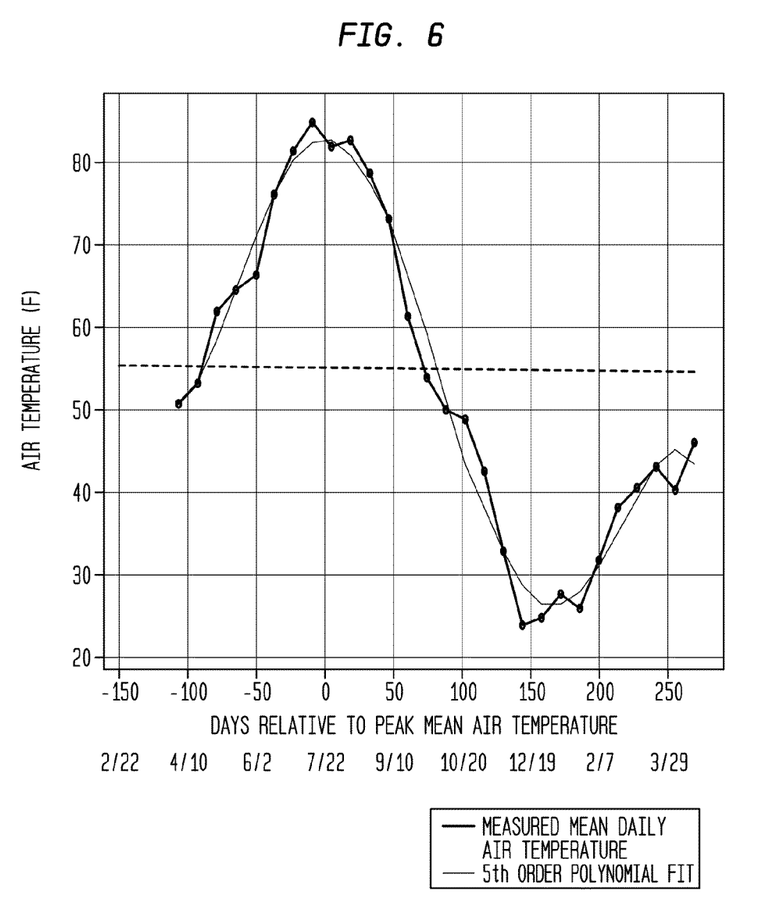
FIG. 6 is a graph showing air temporal thermal signatures; the annual air temperature variations based on 14 day mean daily temperature data and a $5^{th}$ order polynomial fit to the mean data.

The diurnal and annual solar heating periods are the primary drivers (directly and indirectly) of surface temporal thermal responses. FIG. 3 shows the weather station daily near-surface air (below) and 25 cm deep soil (above) temporal thermal wave responses measured in December. FIG. 6 shows the 2007 to 2008 mean annual near-surface air thermal wave response.

The surface air peaks in FIG. 3 precede the 25 cm deep (subsurface) soil peaks by 7 hours. Time shifts vary with the buried objects or tunnels and host material depths, fractional volumes, and thermal inertias, which are bulk material resistances to temperature change. The portable or local weather station data measures the overall effects of cloud cover, wind, relative humidity, dew point, albedo and solar radiation, on the air and shallow subsurface soil (thermal probe) temperatures.

Figure 4A:
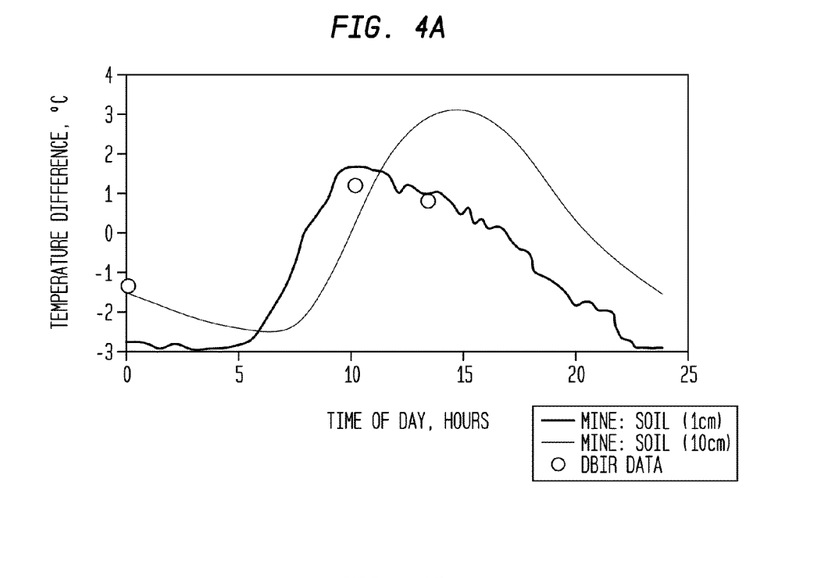
FIGS. 4A and 4B are area graphs of time varying temperature differences between buried object sites or filled hole sites and undisturbed soil sites comparing thermistor data with DBIR corrected thermal image data.
Figure 4B:
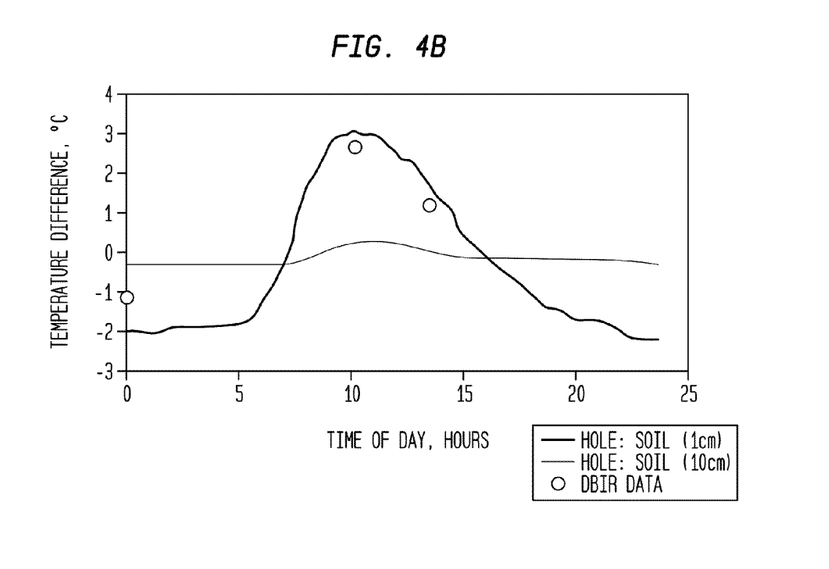
Figure 5A:
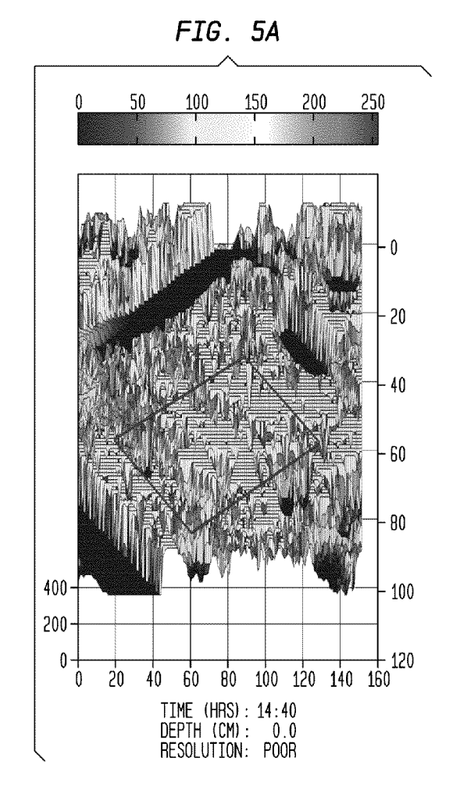
FIGS. 5A, 5B, 5C and 5D show thermal imagery of temporal heat flows from cooling object voids.
Figure 5B:
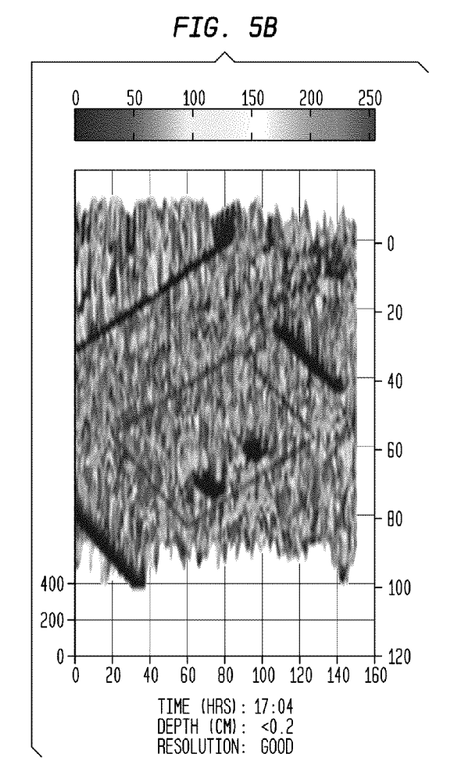
Figure 5C:
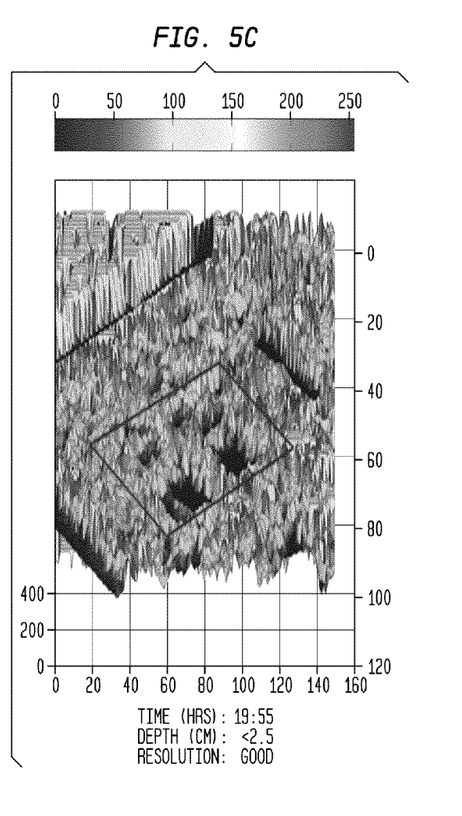
Figure 5D:
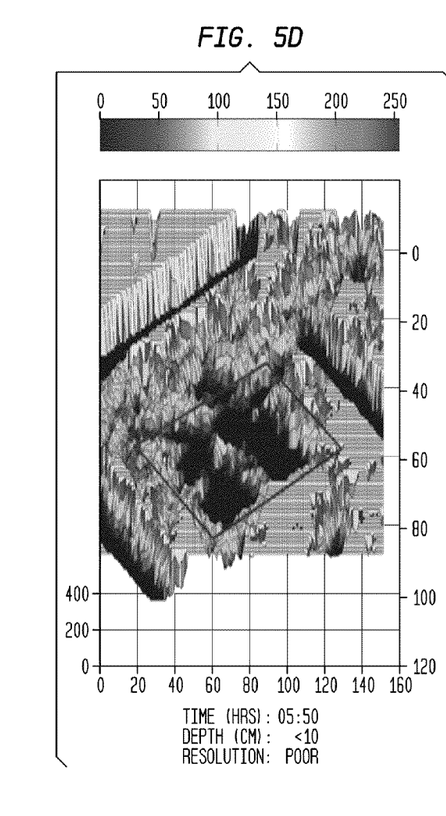

The corrected DBIR thermal images measured object site and hole site (decoy) surface temperature differences which are shown respectively in FIGS. 4A (left) and 4B (right). Time-varying temperature differences between object sites (left) or filled hole sites (right) and undisturbed soil sites are compared using thermistor data with DBIR corrected thermal image data. These sites had DBIR surface temperature differences confirmed by thermistor probe measurements. Their values lay typically between the respective site temperature differences measured for the near-surface air (1 cm above) which is not shown and the near-surface soil (1 cm below) the surface. The peak temporal thermal contrast occurred at 10:00 hrs for 1 cm deep objects and filled hole sites compared to dry sand host material sites.

The object sites thermal contrast from 10:00 hrs to 14:00 hrs decreased 0.5° C., whereas the filled hole site thermal contrast decreased 1.5° C.

Dual-band infrared surface thermal imagery of temporal heat flows from cooling object voids at different depths are seen at different times as shown in FIGS. 5A-5D. The buried hollow objects having displaced the host dry sand material had less thermal inertia per unit volume and larger temperature spreads than the host dry sand. Sand-covered 0.2, 2.5, 10 and 16 cm deep object voids (air gaps) mostly the size of a card deck had below-ambient temperatures at 5:04 μm, 7:55 μm and 5:50 am the following day. Dark spots at the locations of 0.2 cm, 2.5 cm and 10 cm deep objects respectively first appeared at approximately 5 pm, 8 μm, and before 6 am the following day.

Accordingly, buried object sites, having voids or air gaps from displaced earth materials are less dense, have less thermal inertia per unit volume, have faster heating and cooling rates, and have larger daily temperature spreads (highs minus lows) than undisturbed host earth material sites.

The buried object site surface temperature highs and lows occur sooner than the host site surface temperature highs and lows. Consequently, there are periodic (daily and annual) times which highlight surface thermal contrast at the buried object site borders.

For example, in FIG. 4, temperature calibrated DBIR thermal imagery viewed ~1° C. above ambient surface temperature differences at a 10 cm deep buried mine site. In FIGS. 5A-5D, temperature-calibrated DBIR thermal imagery viewed the sand-covered object sites as having below ambient surface temperature differences at or about 17:00 hrs, 20:00 hrs, and 06:00 hrs, respectively for 0.2 cm, 2.5 cm, and 10 cm deep object sites.

Atypical subsurface object sites denser than their surroundings in exposed hollow or semi-empty containers have more thermal inertia per unit volume, smaller high minus low daily temperature spreads, and take longer to heat up and cool down than their surroundings. The atypical subsurface objects have below ambient surface temperatures during the midday or summer temperature highs and above-ambient temperatures during the nighttime or winter temperature lows, unlike the typical subsurface object sites shown in FIG. 1.

Database input is used to characterize temperature highs, lows and (high-low) spreads at the borders of object and host material sites. Curve fitting of measured field data provides a baseline to be used for different weather conditions. The curve fits show the temperature highs, lows and (high-low) spreads for diverse object host materials such as: dry and wet soil, gravel, concrete, pavement and containers with and without a surrogate object. Temperature spread ratios at object site borders spot thermal inertia or effusivity outliers deviating 3 or more standard deviations from the mean undisturbed host site value at the object site border.

Computer analyses of automated air and 1-m or 2-m deep thermal probe data are compared with precise, emissivity-corrected airborne thermal data taken at the same location and during the same time period. The curve fit parameters are stored in a data base.

The data-base look-up tables provide easy access for scheduling the optimum two survey times. Two times during the natural heating and cooling cycle maximize heating and cooling rate (thermal slope) differences for subsurface road material sites with and without embedded objects of varying types, depths and volumes, taken under different weather conditions.

The object sites have enhanced temperature-wave amplitudes, steeper heating and cooling rate slopes and leading upper curves shown in FIG. 1 when their bulk material thermal inertias (or densities) are less than those of the host material. They have increasing (or decreasing) thermal contrast slopes compared to the denser host materials from mid-morning to noon (or from late afternoon to midnight) depending on the host material overburden depths, displaced material volumes and weather conditions included in the data base.

For example, the data base will include curve fit parameters based on a typical $5^{th}$ order polynomial fit to the 14-day annual mean daily air temperature data taken from April 2007 to April 2008 of sand-covered terrain as shown in FIG. 6, which has: extended air temperature highs of 82° F. on or about July 22, lows of 26° F. on or about the following January 6, an annual mean air temperature of 54° F., and thermal cross-over times of April 21, at the onset of above-average and October 12, at the onset of below-average near-surface air temperatures.

These parameters help specify optimum time periods to schedule thermal surveys, which locate and characterize different object types, depths, and volumes, embedded in typical road materials and located under diverse weather conditions.

The ratio of subsurface object temperature spreads relative to that of the ambient terrain is inversely proportional to the ratio of object-site thermal inertias relative to that of the ambient host-site terrain. The ratio of temperature, or T, spreads is $R_T=[T_o/T_h]$ for object and host sites. This is inversely proportional to the ratio of thermal inertias, or P, for object and host sites. It is directly proportional to the reciprocal thermal inertia ratios, $R_p=[P_h/P_o]$.

The time delay decreases (between the air and object site temperature-wave highs and lows) as the daily or annual temperature changes or spreads (highs minus lows) increase and the host-to-object site thermal inertia ratios, $R_p$ increase. This occurs when the soil overburden depth, d, plus the subsurface void height, h, relative to d, is 1.05 or more, based on the following equations for hollow, underground objects:

$$R_T=[1/R_P] \qquad (1)$$

$$R_P=[(d+h)/(d)] \qquad (2)$$

Assume for example the host material temperature spread is 10° C., the overburden is 12 cm deep and the void is 4 cm thick. The void location would have a temperature spread of 13.3° C., or 3.3° C. warmer than ambient soil. The 12 cm deep air gap would be seen 14 or 15 hours after 5 μm or at 7 or 8 am.

The DIRECT method applies empirical data taken under different weather conditions collected from thermistor probes, local or portable weather stations and temperature-calibrated DBIR thermal imagery. Empirical measurements and observations provide input for a data base. The data base tabulates the times, locations and depths of subsurface object sites which have above and below average surface temperature differences greater than 0.5° C. compared to host material sites when measured under variable weather conditions, such as: air temperatures, solar albedos, cloud covers and wind velocities, suitable for locating surrogate objects embedded in manmade or natural host materials.

DIRECT airborne surveys are taken of undisturbed host materials, with host material-like properties and surface cover similar to the location of interest (assuming this is not available). The surveys are taken every month, for example, for at least a year, for over 1 meter deep objects, and every hour, for at least a day, using surrogate objects and voids less than 1 meter deep. This provides a useful base line for locating variable-depth subsurface objects and voids at suitable times, and under suitable conditions.

Data are taken under known weather conditions using surrogate objects less than 1 meter deep surrounded by undisturbed soil. The temporal heat flow thermal signatures are measured and compared for variable-depth surrogate objects and undisturbed natural terrain. Temporal surface thermal signatures are compared inside and outside the borders of buried or covered surrogate objects at 10-minute intervals during two or more diurnal cycles.

As shown in FIG. 6, air temperature data are taken in conjunction with other weather conditions and data for surrogate objects more than 1 meter deep surrounded by undisturbed soil. The temporal heat flow thermal signatures are measured and compared for variable-depth surrogate objects and undisturbed natural terrain. Temporal surface thermal signatures are compared inside and outside the borders of buried or covered surrogate objects at half-hourly or hourly intervals during one or more annual cycles.

The daily (or annual) temperature-wave curve fit parameters are stored in a data base look up table. They are based on measured data taken under different weather conditions. They include extended surface temperature highs, lows, mean values, time periods with increasing and decreasing thermal slopes and cross-over times (to be avoided) when thermal contrast is less than 0.5° C. They specify time periods when thermal contrast is more than 0.5° C., needed to locate objects or air gaps embedded in typical road materials, or structures.

The data confirms thermal surveys with optimum thermal contrast. They are used to schedule thermal surveys under suitable weather conditions at least twice a day at times depending on the air temperature response, and the object site depth, volume and host material properties. The peak thermal contrast inside versus outside shallow subsurface object site borders occurs after the steepest mean rising (or falling) air temperature slopes from mid-morning to noon (or from the late afternoon or early evening to midnight) and before the host material site steepest rising (or falling) temperature slopes.

As shown in FIG. 1, thermal inertia contrast locates object sites with less soil per unit volume, and less thermal inertia than the host material sites, minutes to hours before the undisturbed host material starts to heat up or cool down. Thermal inertia contrast between disturbed and undisturbed host materials is maximum when the soil temperatures cool down after 17:00 hrs, depending on the host material and overburden depth.

Based on precise airborne DBIR thermal imaging surveys similar to those shown in FIGS. 5A-5D, the time delay for viewing the surface above shallow object sites less than 1 m deep with varying overburdens is roughly 1.2 hrs per cm, 3 hrs per 2.5 cm, and 12 hrs per 10 cm of dry sand overburden.

The time delay after the July 22 summer air temperature peak in FIG. 6, for viewing the surface site of hollow structures 2 to 15 m deep is roughly 25 days per meter, for dry sand overburdens and 4 days per meter for solid rock overburdens. This applies to the average of three sand-covered pipe measurements; a 0.2 m diameter, 11 m deep, pipe viewed after a 256 day delay, and 1 m diameter slanted pipe sections, 2 m and 5 m deep viewed after 51 day and 134 day delays. Also, a 3 m high, 2 to 15 m deep, descending rock-covered drain was viewed after a 60 day delay. Thermal inertias for solid limestone rock and dry sand, relative to equal-volume air gaps are roughly 800 to 1 and 120 to 1.

Figure 7:
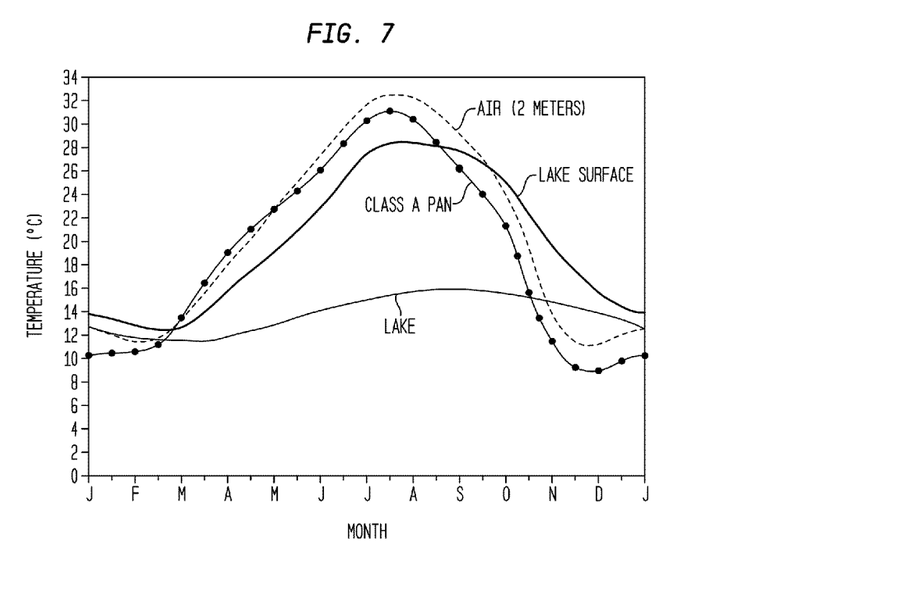
FIG. 7 is a graph showing air and lake temporal thermal signatures; the average annual variations of the air temperature at 2 m, the water temperature in a shallow sunken pan, the lake surface temperature, and the Lake Mead, Nev. temperature based on data obtained by Kohler, et al. (1958) in 1952 and 1953.

In FIG. 7, the temporal thermal inertia water signatures are shown as potentially useful to detect and locate a submerged semi-empty SSED or object container which is less (or more) dense than water. The sites of less dense containers or vessels anchored in water have less thermal inertia and heat and cool faster than the lake surface, whereas the sites of more dense containers have more thermal inertia and heat and cool slower than the lake surface.

Thermal surveys should be scheduled twice to enhance the difference between subsurface explosive device (SSED) lake surface thermal inertias and natural lake surface thermal inertias. The first time for enhancing the SSED site rising surface temperature contrast is likely to be days to weeks before (or after) June 8, since air temperature highs occurred July 19, and lake surface temperature highs occurred August 2. The second time for enhancing the SSED site falling surface temperature contrast is likely to be days to weeks before (or after) November 12, since air temperature lows of the following year occurred February 3, and lake surface temperature lows occurred February 26.

The present invention provides an alternative approach to using an Annual Surface Climate Energy Budget (ASCEB) model described in the patented method incorporated herein. It uses airborne surveys in conjunction with ground thermal probe data fits stored in the data base for different weather conditions. The curve fits of air and host material temporal thermal changes distinguish subsurface object or void sites from normal, undisturbed host material sites.

Realistic temporal input parameters provide an empirical approach to locate and characterize the depth and dimensions of subsurface object or void sites. This empirical method is used to enhance detection of thermal inertia outliers at the borders of a subsurface object or void, without using the ASCEB model. The data base provides temporal surface thermal data obtained at an alternative location, having similar surface covers, host materials and surrogate objects. This empirical method uses temporal thermal-difference maps to mark unsafe terrain, which has subsurface object sites surrounded by undisturbed heterogeneous terrain. This approach works when earlier temperature simulation model approaches were ineffective.

The present invention provides a temporal method for detecting an underground object surrounded by a host material, where the detection is accomplished by using thermal inertia diagnostics, which removes both surface and subsurface foreign-object clutter. The host material is analyzed using visible, temperature, and time-enhanced thermal inertia imagery to highlight the contrasting thermal difference features of the host material site from those of the object site at the object site borders. The area of interest is then scanned simultaneously at two or more different wavelengths of radiation to produce a time sequence of images taken at different times determined empirically during the day and night or at different months during the year, e.g., once when the host material site is below the mean daily (or mean annual) host site temperature and after the air and object site temperature is above the mean daily (or mean annual) host site temperature, and again when the host material site is above the mean daily (or mean annual) host site temperature and after the air and object site temperature is below the mean daily (or mean annual) host site temperature. The time sequence of dual-IR images are processed into signal ratios for locating subsurface objects and voids and removing clutter.

Obtaining a temperature versus time history determines the size, shape, volume, depth, type and location of the object. Despite the elimination of clutter of a reflective nature, images cannot be interpreted very easily without also studying the time history of dual infrared image ratios, which eliminates clutter of a non-thermal nature.

Other informative maps may be generated by repeating temperature survey measurements at two or more different times when the diurnal or seasonal temperature spreads provide the greatest contrast for the object and host material, compared to subsurface foreign objects and foreign materials which produce clutter of a thermal nature which has a different time signature depending on the depth of the foreign object or material.

Thermal image clutter may be identified and removed by mapping the maximum minus the minimum temperature spread from co-registered day minus night, or autumn minus spring, temperature maps. Thermal image clutter is produced by foreign objects, and materials, such as: disturbed terrain, animal holes, sink holes, roots, bushes, water, mud and rocks which resist diurnal and seasonal temperature changes differently than the sought-after object and host material.

The diurnal or seasonal temperature spread provides a unique signature to identify and remove thermal image clutter when combined with the different location, size, shape, volume, depth, and inverse thermal inertia which distinguishes foreign objects and materials from the targeted object.

The corrected temperature data is used to generate corrected temperature and temperature-spread maps. Corrected temperature and temperature-spread maps are color-coded images that show color patterns of conducted heat generated by objects which heat and cool at different rates relative to the surrounding materials. These patterns are distinguished from the patterns produced by foreign objects, materials and structures.

The interpretation of the images is improved by removing the clutter and thus increasing the signal to noise ratio. As a result, corrected images are formed, thereby facilitating the removal of heat flow anomalies associated with subsurface clutter.

Automatic target recognition may be used to remove reflective emissivity signal clutter from infrared signals which produce emissivity-noise, for example, maps are overlaid related to temperature, T, and emissivity ratios, $R_C$, from Equations 1, 2, and 4 from U.S. Pat. No. 5,444,241, incorporated herein by reference, for dual band infrared wavelengths detected at 5 and 10 micrometers.

$$T=[I_5/I_{10}]/[I_5/I_{10}]_{Average} \quad (3)$$

$$T=[(\epsilon_5/\epsilon_{10})(T)^5]/[(\epsilon_5/\epsilon_{10})(T)^5]_{Average} \quad (4)$$

$$R_C=[(I_{10})^2/I_5]/[(I_{10})^2/I_5]_{Average} \quad (5)$$

$$R_C=[(\epsilon_{10})^2/\epsilon_5]/[(\epsilon_{10})^2/\epsilon_5]_{Average} \quad (6)$$

Emissivity ratios, $R_C$ which do not vary with temperature are detected at co-registered T sites where $R_C$ sites that are not within plus or minus two standard deviations from the average $R_C$ ratio are removed and replaced with an average value. The result is an emissivity-corrected temperature map.

To remove thermal signal clutter from heat flows unlike heat flows associated with the object or host material, a comparison is made of the measured and calculated surface temperature spread ratio at the hollow or semi-empty object site void, $\Delta T_v$ relative to the ambient site temperature spread $\Delta T_a$. The measured relative temperature spread ratio is obtained by overlaying and subtracting co-registered temperature maps at the void site border taken during day and night, or autumn and spring.

Thermal inertia maps are used to track the emptiness or void such as produced by a gas filled gap inside naturally or artificially heated pipelines or other hollow or semi-empty objects subjected to changed weather conditions. Thermal inertia is a thermal property of the layered earth materials within the naturally-heated terrain. The thermal inertia varies directly as the terrain resistance to temperature change and inversely as the terrain temperature change produced by seasonal temperature highs and lows.

A column of undisturbed terrain has more thermal inertia than a column of equal volume which contains a void. When equal volumes of solid or semi-solid earth materials are compared to air, their thermal inertia ratios are approximately: 800 for rocks, 400 for wet sand, 300 for water and 100 for dry sand. After correcting for the void volume fraction, the ratios are smaller. When the void is "d" feet deep and "h" feet high, temperature highs minus temperature lows are roughly [(d+h)/d] times larger inside than outside tunnel borders where the terrain is undisturbed.

The thermal inertia method detects 0.5° C. high minus low temperature spread differences for typical annual temperature spreads greater than 10 degrees C. when hollow or semi-empty object void depths, d are less than 20 times their heights, h, such that [(d+h)/d] is greater than 1.05. The proof of this follows below. Assume the void temperature change is $[\Delta T]_v$ and the ambient terrain temperature change is $[\Delta T]_a$. The temperature change ratio, $R_{\Delta T}$ is $[\Delta T]_v/[\Delta T]_a$. This varies as the inverse thermal inertia (1/P) ratio, $R_{1/P}$ which is $[P_a/P_v]$, since thermal inertia is the resistance to temperature change, and varies inversely as the temperature spread or change.

$$R_{\Delta T}=[\Delta T]_v/[\Delta T]_a \quad (7)$$

$$R_{\Delta T}=[P]_a/[P]_v \quad (8)$$

$$R_{\Delta T}=[P]_a/[\{h/(d+h)\}(P_v)+[(d/(d+h)](P_a)] \quad (9)$$

$$R_{\Delta T}=(d+h)/d \quad (10)$$

Equation 10 follows from Equation 9 by dividing the numerator and denominator by $[P]_a$ and ignoring the first term in the denominator, since $[P_v/P_a]$ is negligibly small for typical earth materials. The temperature spread ratio is calculated from the depth plus height of the material gap which displaced the earth or manmade material relative to the depth of the undisturbed earth or manmade overburden material.

An embodiment of the process steps of the present invention will now be described. A selection is made of a host and a subsurface object site environment. The host and subsurface object site environment are naturally heated, not artificially heated. A survey is carried out of the host and the object site surface temperatures using thermal probes. The surface temperature of the host and object site is measured periodically over the course of a year so as to include seasonal highs and lows.

The collected actual data of surface material temperatures are plotted based on the temporal behavior of the host material, the buried object or surrogate object and the temperature contrast in a manner as shown in FIG. 1. Plotting the temporal behavior over a yearly cycle is preferred for detecting buried objects at a depth of about 1 meter or greater. For objects buried less than 1 meter, the temporal behavior may be measured over a daily cycle encompassing daily temperature highs and lows such as shown in FIG. 1.

The host and object site, based upon the empirical temperature data obtained of the host and object site, are then scanned at different times with two different IR wavelengths (e.g., 3-5 microns and 8-12 microns) and a spatial sequence is recorded of dual-band IR images at different times as described in U.S. Pat. No. 7,157,714.

The thermal inertia of the object site is most distinguishable from that of the host site when their respective thermal signatures have the most differences. As evident from FIG. 1, this occurs prior to the object site highest temperatures in July and prior to its lowest temperatures in January. For example, shallow hollow object sites have enhanced above-ambient temporal surface heat flow signatures from 9 to 11 am, and during May and June, when the air and object site surface temperatures rise above, and the undisturbed host site surface temperatures remain below, the mean undisturbed host site surface temperatures.

There is a thermal phase change from above ambient to below ambient temperatures. This occurs roughly 12 hours or 6 months later. Thus, shallow hollow object sites have enhanced below-ambient temporal surface heat flow signatures from 9 to 11 pm, and during November and December, when the air and object site surface temperatures fall below, and the undisturbed host site surface temperatures remain above, the mean undisturbed host surface temperatures.

The temporal response routine fits actual data recorded during favorable calm, clear, dry summer months or less favorable winter days with mild winds, light cloud cover and scattered showers when the thermal imagery is less effective. Curve fits smooth, merge, and characterize data taken during four periods: near sunrise when shallow surface materials are warming, midday when there is little change, late afternoon when shallow surface materials cool at the fastest rate and late evening when shallow surface materials cool at a slower rate.

The de-clutter routine co-registers dual band IR thermal images and masks areas which have "apparent thermal" differences using MWIR and LWIR thermal imagery. It provides corrected temperature maps, and emissivity (spectral-difference) maps.

The feature recognition routine combines the co-registered, corrected temperature images taken at two times when the host material sites (displaced or not displaced by an embedded object) have the largest temperature contrast at the site of an object. These times are determined using look-up tables in the data base. The data base is composed of the results of curve-fitted field data taken using surrogate object materials surrounded by typical host materials.

A record is made of the object and host temperature, thermal inertia and temperature spreads. A calculation is made, on a computer workstation using an image-processing code of signal ratios and differences to form temperature, emissivity-ratio and corrected-temperature maps. Emissivity, temperature and temperature-spread maps are then co-registered. Temperature maps and temperature-spread maps are then corrected. Foreign object thermal clutter is removed from the temperature-spread maps. Object location, size and shape are determined from the temperature maps. Object thickness, volume, and depth information are obtained from the temperature-spread maps. Object location is determined and a 3-D visual display of the object is provided.

The DIRECT method is a unique tool to detect subsurface objects and air gaps or voids. It remotely senses, locates, and characterizes hazardous sites in near real time. It specifies object or gap coordinates, depths, and volumes in a 3-D visual display. It images underground (and underwater) semi-empty objects and structural gaps. It inspects delaminated bridge decks and corrosion-thinned, natural gas pipelines. It locates embedded explosive devices and underground tunnels in near real time.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A temporal thermal method for detecting thermal inertia differences comprising:
    using an empirical method to determine a first imaging time and a second imaging time;
    creating a first temperature map from data obtained by imaging at least one IR wavelength band at the first imaging time at a first location and a second location;
    creating a second temperature map from data obtained by imaging at least one IR wavelength band at the second imaging time at the first location and the second location; and
    using a computer to determine the existence of a thermal inertia difference between the first location and the second location using the first and second temperature maps, wherein the first imaging time occurs before the first location reaches its daily low thermal response or annual low thermal response, and wherein the second imaging time occurs before the first location reaches its daily high thermal response or annual high thermal response;
    wherein the temperature difference between the first location and the second location is greater than a surface emissivity noise of the first and second locations, whereby the first imaging time and the second imaging time occur when the thermal response between the first and second locations is sufficient to detect an artifact at one of the locations.

2. The method of claim 1, wherein the at least one IR wavelength band comprises an IR band having a wavelength of from 3-5 microns and an IR band having a wavelength of from 8-12 microns.

3. The method of claim 1, wherein the first location comprises a host site.

4. The method of claim 3, wherein the second location comprises an artifact site.

5. The method of claim 1, wherein the thermal response is greater than 0.5° C.

6. The method of claim 4, wherein the empirical method includes maintaining a data base of temporal thermal responses for a surrogate host site and a surrogate artifact site for different weather conditions.

7. The method of claim 6, wherein the temporal thermal responses identify the first and second imaging times for different weather conditions.

8. The method of claim 7, wherein the second imaging time corresponds to when the host site thermal response is below its daily high or annual high temperature.

9. The method of claim 8, wherein the first imaging time corresponds to when the host site thermal response is above its daily low or annual low temperature.

10. The method of claim 1, wherein the second location comprises a host material disturbed site including an artifact and the first location comprises a host material undisturbed site, wherein the host material disturbed site has less or greater thermal inertia than the thermal inertia of the host undisturbed material site.

11. The method of claim 10, wherein the artifact comprises a subsurface located object or a surface located object.

12. A temporal thermal method for detecting an artifact comprising:
    creating a first temperature map from data obtained by imaging at least one IR wavelength band at a first imaging time at a first location and a second location, the first location comprising a host site and the second location comprising an artifact site, wherein the first imaging time is based upon the temporal thermal response of one of a surrogate host site or a surrogate artifact site;

creating a second temperature map from data obtained by imaging at least one IR wavelength band at a second imaging time at the first location and the second location, wherein the second imaging time is based upon the temporal thermal response of one of the surrogate host site or the surrogate artifact site; and using a computer to determine the existence of an artifact using the first and second temperature maps, wherein the first imaging time occurs before the host site reaches its first daily low thermal response or annual low thermal response, and wherein the second imaging time occurs before the host site reaches its first daily high thermal response or annual high thermal response;

wherein the temperature difference between the first location and the second location is greater than a surface emissivity noise of the first and second locations, whereby the first imaging time and the second imaging time occur when the thermal response between the first and second location is sufficient to detect an artifact.

13. The method of claim 12, wherein the at least one IR wavelength band comprises an IR band having a wavelength of from 3-5 microns and an IR band having a wavelength of from 8-12 microns.

14. The method of claim 12, wherein the thermal response is greater than 0.5° C.

15. The method of claim 12, further including maintaining a data base of temporal thermal responses for a surrogate host site and a surrogate artifact site for different weather conditions.

16. The method of claim 15, wherein the temporal thermal responses identify the first and second imaging times for different weather conditions.

17. A temporal thermal method for detecting an artifact from thermal inertia differences between a host site and an artifact site, the method comprising:

establishing a data base of temporal thermal responses for a surrogate host site and a surrogate artifact site under different weather conditions;

creating a first temperature map from data obtained by imaging at least one IR wavelength band at a first imaging time at a host site and at an artifact site, the first imaging time corresponding to when the surrogate host site thermal response occurs before its daily low or annual low temperature obtained from the data base;

creating a second temperature map from data obtained by imaging at least one IR wavelength band at a second imaging time at the host site and at the artifact site, the second imaging time corresponding to when the surrogate host site thermal response occurs before its daily high or annual high temperature;

using a computer to determine thermal response differences between the host site and artifact site using the first and second temperature maps to detect an artifact at the artifact site;

wherein the temperature difference between the host site and the artifact site is greater than a surface emissivity noise of the host site and the artifact site, whereby the first imaging time and the second imaging time occur when the thermal response between the host site and the artifact site is sufficient to detect an artifact at one of the locations.

18. The method of claim 17, wherein the thermal response difference is greater than 0.5° C.

19. The method of claim 17, wherein the artifact comprises a subsurface object or void.

20. The method of claim 17, wherein the artifact comprises a structural flaw.

21. The method of claim 17, wherein the at least one IR wavelength band comprises an IR band having a wavelength of from 3-5 microns and an IR band having a wavelength of from 8-12 microns.

22. A temporal thermal method for detecting an artifact from thermal inertia differences between a host site and an artifact site, the method comprising:

storing temporal thermal responses in a data base for a host site and an artifact site;

obtaining data from imaging at least one IR wavelength band at the host site and artifact site corresponding to when the host site thermal response occurs before its daily low or annual low temperature obtained from the data base;

obtaining data from imaging at least one IR wavelength band at the host site and artifact site corresponding to when the host site thermal response occurs before its daily high or annual high temperature obtained from the data base; and using a computer to determine thermal response differences between the host site and artifact site using the obtained data to detect an artifact at the artifact site;

wherein the temperature difference between the host site and the artifact site is greater than a surface emissivity noise of the host site and the artifact site, whereby the first imaging time and the second imaging time occur when the thermal response between the host site and the artifact site is sufficient to detect an artifact at one of the locations.

23. The method of claim 22, wherein the artifact comprises a structural flaw, a subsurface object or void.

24. The method of claim 23, wherein the at least one IR wavelength band comprises an IR band having a wavelength of from 3-5 microns and an IR band having a wavelength of from 8-12 microns.

25. The method of claim 22, wherein the data base includes temporal thermal responses for the host site and the artifact site for different weather conditions.

26. The method of claim 22, wherein the thermal response difference is greater than 0.5° C.

* * * * *